UNITED STATES PATENT OFFICE.

FELIX GIESE, OF ZOPPOT, AND WILHELM WOLTERS, OF ILDEHAUSEN, GERMANY.

PROCESS OF MANUFACTURING PHOSPHORIC-ACID COMPOUNDS.

1,025,619.  Specification of Letters Patent.  Patented May 7, 1912.

No Drawing.   Application filed November 17, 1911.   Serial No. 660,892.

*To all whom it may concern:*

Be it known that we, FELIX GIESE and WILHELM WOLTERS, citizens of the German Empire, residing at Zoppot, Germany, and Ildehausen a. Harz, Germany, respectively, have invented certain new and useful Improvements in Processes of Manufacturing Phosphoric-Acid Compounds, of which the following is a specification.

This invention relates to a process of manufacturing phosphoric acid compounds which are soluble in citric acid and on account of this property may be used for manuring purposes.

In the process of the invention natural phosphates are melted together with artificial silicates and the melted mass is finely distributed by a blast of commingled steam and air. The phosphoric compounds which are formed by the melting together of the phosphates and of the silicates are transformed by such treatment with a current of steam and air mixture into compounds which are nearly completely soluble in citric acid. This effect is obtained by comparatively small additions of artificial silicates to the natural phosphates so that even poor phosphates can be made available for manuring purposes.

In carrying out the invention it is advisable to combine the process of manufacturing the artificial silicates with the process of melting the same together with the natural phosphates. Therefore the invention is carried out in a preferred embodiment by melting together the natural phosphate with the raw materials for the artificial silicate which it is intended to bring to reaction with the phosphate. For instance one may add to 100 parts of a natural Belgian phosphate 45 parts of acid sodium sulfate, 28 parts of limestone and 27 parts of sand. This mixture is melted at a temperature of about 1300° and subdivided by a stream of a mixture of steam and air. The stream of steam and air may be produced by an ejector with steam pressure of 3 to 4 atmospheres. The steam and air current is adapted to throw the molten mass to a distance of about 15 m. and to produce such a fine division of it that a poppy-seed like granular material is obtained. In calculating the quantity of raw materials for the silicate to be formed the contents of the phosphate in substances adapted for forming the silicate are to be taken into consideration, so that it is not always necessary to add to the phosphate the whole quantity of raw materials for the formation of the silicate, because a part of same may be contained in the phosphate.

In a further embodiment of the invention the natural phosphate was melted together with a ready made artificial silicate. In this particular case, for each 100 parts of phosphate 45 parts of silicate were taken, the silicate consisting of one equivalent of alkali silicate and two equivalents calcium silicate. In the case where the natural phosphate contained 26.7% phosphoric acid ($P_2O_5$) the product obtained by the process of the invention contained 18.2% phosphoric acid and of this 18% was soluble phosphoric acid.

The subdivision of the mass in the manner described, by a blast of commingled steam and air is important as insuring such rate of cooling as has proven most effective in securing a high degree of citric solubility in the product. Proper subdivision of the molten mass requires a high blast-pressure, and if steam alone were used under sufficient pressure, its consequent high temperature would render proper cooling impossible: similarly air alone, by reason of its low specific heat is ineffective as a cooling agent at any pressure which is suitable for subdividing the mass. On the other hand, a mixture of air with steam gives a satisfactory subdivision of the mass, and at the same time a proper cooling effect.

What we claim is:—

1. The herein-described process of preparing readily soluble phosphates, which consists in melting natural phosphates in presence of the chemical elements of a silicate, and mechanically subdividing and cooling the molten mass by a blast of commingled steam and air.

2. The herein-described process of preparing readily soluble phosphates, which consists in melting natural phosphates in presence of substances adapted to react with formation of silicates, and mechanically subdividing and cooling the molten mass by a blast of commingled steam and air.

In testimony whereof, we affix our signatures in presence of two witnesses.

FELIX GIESE.
WILHELM WOLTERS.

Witnesses:
    FRIEDA BARTELS,
    EMMA ZIEHE.